United States Patent Office 3,654,217
Patented Apr. 4, 1972

3,654,217
POLYMERIC THERMOPLASTIC COMPOSITIONS BASED ON POST-CHLORINATED POLYVINYL-CHLORIDE HAVING IMPROVED WORKABILITY AND IMPACT RESISTANCE
Egidio Cerri, Mestre, Italy, assignor to Montecatini-Edison S.p.A., Milan, Italy
No Drawing. Filed June 20, 1967, Ser. No. 647,310
Claims priority, application Italy, June 23, 1966, 14,336/66
Int. Cl. C08f 29/18, 45/04
U.S. Cl. 260—41
10 Claims

ABSTRACT OF THE DISCLOSURE

A composition of matter comprising: (a) at least one member selected from the group consisting of a chlorinated polymer of vinyl chloride and a chlorinated copolymer of vinyl chloride, (b) at least one graft copolymer of a halogenated polyolefin and a member selected from the group consisting of a polymer of vinyl chloride and a copolymer of vinyl chloride, and (c) at least one mineral filler.

BACKGROUND OF THE INVENTION

The present invention relates to thermoplastic polymeric compositions based on post-chlorinated polyvinyl chloride having improved workability and impact-resistance. More particularly, this invention relates to rigid thermoplastic polymeric compositions which exhibit such technological, chemical and chemical-physical characteristic so as to render the same readily workable on the usual processing machinery and advantageously employable as finished articles, in all those fields where direct contact with water, corrosive liquids, fumes and hot gases of rather high temperatures (70°–100° C.) is foreseen.

It is known that chlorinated polyvinylchloride, in comparison with normal polyvinylchloride, offers considerable interest inasmuch as, while maintaining the properties of the latter, such as, for instance, chemical inertia with respect to many agents of an acid or basic character, good resistance to ageing, good resistance to flame propagation, etc., it exhibits however, a better resistance to deformation under heat, thus offering a considerably wider potential field of application wherein high thermal resistance is requested.

However, it is known that compositions based on chlorinated polyvinyl chloride require processing temperatures that are higher than those normally required for non-post chlorinated polyvinyl chloride and, in addition, exhibit the very serious drawback of much more difficult processability on conventional processing equipment.

It is also known in the art that a further shortcoming of products made up of post-chlorinated polyvinyl chloride is the very high fragility of these products under normal conditions of use.

In order to overcome these drawbacks and thus improve the processability and the impact-resistance, one can resort to the incorporation of plasticizers or softening agents which produce, however, undesirable secondary effects (such as, for instance, a marked decrease of heat resistance, greater sensibility to chemical agents, poorer electrical characteristics) which actually lead to a limitation in the fields of application of the post-chlorinated polyvinyl chloride or even exclude its use in the field of rigid manufactured articles.

Therefore, an object of this invention is to improve the processability and the impact-resistance, while maintaining thermal resistance at a high level, of the polymeric compositions based on post-chlorinated polyvinyl chloride, so that they may be easily processed on standard processing equipment (extruders, calenders, compression presses and injection presses) and be advantageously used in the form of tubes, shaped elements, tools, components of electrical equipment and of rigid articles in general in all those cases where there may be contact with water, corrosive liquids, gas, fumes and the like, at rather high temperatures generally ranging from 70° to 100° C.

THE INVENTION

These and still other objects are achieved by thermoplastic polymeric compositions according to this invention which, besides incorporating the usual additives in use in common practice for similar purpose, for instance thermal stabilizers, stabilizers to light and to atmospheric agents, UV absorbers, anti-oxidation agents, anti-blocking agents and optionally dyes, according to this invention are constituted by a mixture comprising:

(a) at least one post-chlorinated polymer and/or copolymer of vinyl chloride
(b) at least one graft-copolymer of a halogenated polyolefin and a vinyl chloride polymer and/or copolymer
(c) at least one compound acting as a mineral filler.

In fact, it has been surprisingly found that the polymeric compositions formulated according to the present invention are characterized by:

a good processability on conventional processing and/or transforming machines
good mechanical characteristics
satisfactory impact-resistance, both at low temperatures and at room temperature
satisfactory heat-resistance.

When using the polymeric compositions of this invention, the surprising result is achieved of simultaneously improving processability, impact-resistance and resistance to flexure under load of the manufactured articles obtained therefrom while the other characteristics, which by themselves are already quite satisfactory, remain practically unaltered.

The post-chlorinated polymers and/or copolymers of vinyl chloride, to be used in the composition of this invention, may be chosen from a wide range of polymeric materials prepared according to techniques well known in the art.

It is preferred to use the products obtained through the chlorination of polyvinyl chloride or of copolymers of vinyl chloride containing at least 50%, but preferably more than 80% by weight of chemically combined vinyl chloride with a Fichentascher K-number comprised between 40 and 80, but preferably between 50 and 70.

The polymeric materials to be used according to the present invention in the case of post-chlorinated polyvinyl chloride, are characterized by a specific viscosity in cyclohexanone (at 0.4% weight/volume and at 25° C.) varying between 0.4 and 0.5, by a specific gravity of from 1.55 to 1.58 gr./cc. at 25° C., which indicates contents of from 63 to 67% in combined chlorine, by a Vicat penetration temperature (ASTM D 1525–52 T, (mod.) with a weight of 5 kg.) comprised between 114 and 122° C.

These chlorinated products can be prepared according to well known methods of chlorination of vinyl chloride polymers and/or copolymers. Particularly suited for the objects of the present invention are the products prepared according to U.S. patent application, Ser. No. 566,231, filed July 19, 1966, and now abandoned in favor of presently allowed continuation application, Ser. No. 871,558, filed Nov. 3, 1969; and U.S. patent application, Ser. No. 616,053, filed Feb. 14, 1967, and now abandoned, all assigned to the assignee herein.

The graft-copolymers between a halogenated polyolefin and a polymer and/or copolymer of vinylchloride to be used in the composition according to this invention may be selected from a wide range of products.

Particularly advantageous results are attained by using, according to this invention, a polymeric material obtained by the graft-polymerization in an aqueous suspension of vinyl chloride in the presence of chlorinated polyethylene of the type known on the market as LD 184 or LD 408, produced by Du Pont U.S.A.

These products contain from 8% to 12% of chlorinated polyolefins and are characterized by an apparent density varying from 0.5 to 0.7 gr./cc., with such a particle size as to have on a 40 mesh sieve a residue of 10% and on a 140 mesh sieve a residue of 55%; such graft-copolymers being furthermore characterized by a specific viscosity in cyclohexanone varying from 0.41 to 0.45.

These graft-copolymers are used in the polymeric compositions according to the invention in quantities varying from 0.5 to 100, but preferably from 5 to 50 parts per 100 parts by weight of chlorinated polymers and/or copolymers of vinyl chloride.

The substances that may be used in the compositions according to this invention, as mineral fillers, are also selected from a wide range of products, the nature and characteristics of which are well known to one of ordinary skill in the art.

A class of preferred substances comprises calcium carbonate, quartz, silica, alumina and the like, in the form of particles, optionally coated with mineral waxes, fatty acids, soaps and the like; these particles have such dimensions that 60% will have a diameter less than 3 microns and that at least 80% will have a diameter less than 10 microns.

These substances are used, according to the present invention, in quantities comprised between 5 and 50, but preferably around 15 parts by weight per 100 parts by weight of chlorinated polymers and/or copolymers of the vinyl chloride.

The compositions of this invention may be prepared by mechanical mixing of all the components in a conventional ribbon mixer or, preferably, in a Henschell-type high-speed mixer, in order to facilitate as much as possible the mutual dispersion.

A pre-dispersion can also be prepared of the various additives necessary for a suitable subsequent processing; such a pre-dispersion is thereafter added to the phase of the thermoplastic polymeric materials (chlorinated polyvinylchloride plus graft copolymer of chlorinated polyolefine and polyvinyl chloride) and the entire mass is then further mixed following one of the above described methods.

The mixture thus obtained (dry-blend) is then processed at high temperature, for instance between 180° and 210° C., using a mill-roll, that is an internal mixer of the Banbury type, until a homogeneously melted mass is obtained.

This mass may be transformed into sheets which, after cooling, are used as such, for instance for the preparation of the specimen for the determination of the various properties or granulated in form of small cubes.

Another possibility concerns the direct extrusion either of the powdery-phase (dry-blend) or of the homogeneously melted mass through a spinneret having many small holes and fitted with a cutting blade; also in this case an intermediate product is obtained of a granular form very easy to be handled.

In order to further illustrate the present invention and the advantages thereof the following specific examples are given, it being understood that the same are intended merely as illustrative and not limitative.

Example 1

Three polymeric compositions were prepared in which the type and quantity of post-chlorinated polyvinyl chloride, thermal stabilizer, co-stabilizer and lubricant, were the same, with different quantities of mineral filler being used.

The characteristics and quantities of the components of the mixtures are listed in the following Table 1.

TABLE 1

|  | Control | Sample | | |
| --- | --- | --- | --- | --- |
|  |  | A | B | C |
| PVC/Cl [1] | 100 | 100 | 100 | 100 |
| Filler [2] |  | 5 | 15 | 20 |
| Thermal stabilizer [3] | 1.5 | 1.5 | 1.5 | 1.5 |
| Co-stabilizer [4] | 0.5 | 0.5 | 0.5 | 0.5 |
| Lubricant [5] | 1.0 | 1.0 | 1.0 | 1.0 |

[1] Post-chlorinated polyvinylchloride with the following characteristics: specific weight, 1.535 gr./cm.$^3$; combined chlorine percentage, 65.2%; specific viscosity, 0.460; porosity, volume of pores, 0.11 cm.$^3$: gr.; diameter of pores, 0.66 microns; vicat penetration temperature, 121° C.; thermal stability expressed as K-constant of dehydrochlorination at 180° C., 0.490 10$^{-3}$ hours$^{-1}$.
[2] AL-SIL-ATE-W (washed and calcined Kaolin of high purity) of the Columbian Carbon International.
[3] Mark WS/X (Barium-cadmium laurate) of Argus Chemical Co., U.S.A.
[4] Paraplex G 60 (epoxided soya-bean oil) of Rohm-Haas, Germany.
[5] E-wax of Farbwerke Hoechst, Germany.

The components of the mixture, listed above, were mixed for 15 minutes in a ribbon mixer at 90°–100° C.; the mixtures thus obtained were then, under constant stirring, cooled to 40° C. in 30 minutes.

The dry-blend thus obtained was then processed in a millroll, the front-roll of which was kept at 190° C. and the rear-roll at 200° C.; the processing was carried out for a total time of 6 minutes; the raw sheet thus obtained (crepe) was used for the preparation of "test-plates" having varying dimensions and shapes depending on the characteristics to be determined.

It was preferred to use this evaluation procedure, that is, that of pressed plates and therefore of isotropic materials, just in order to dispose of data mutually homogeneous and comparable, inasmuch as it is well known in the art that the manufactured products, since they can be differently oriented during the processing step, may present mechanical parameters which are from case to case different or at least not mutually comparable depending on the type of working.

(a) Plates for obtaining specimens for the Izod resilience-tests.—80 gr. of raw sheet were put into a 127 x 127 x 3.2 mm. frame which was then subjected for 5 minutes to a pressure of 150 ATE within a vertical plates press (250 x 250 mm.), the plates having a temperature of 175°–180° C.

The plate thus obtained had a thickness of 3 mm. and from this latter specimens were obtained through milling which had a size of 63.5 x 3.2 x 12.7 mm. and a suitable V-shaped notch. The test was then effected according to the method described in the ASTM D 256–56.

(b) Plates for obtaining specimens for the test of resistance to flexure.—190 gr. of raw-sheet were inserted into a 150 x 127 x 6.4 mm. frame which was then subjected for 10 minutes to a pressure of 150 ATE in a vertical plates press (250 x 250 mm.), the plates having a temperature of from 175–180° C.

The plates thus obtained has a thickness of 6.0 mm. and from this latter specimens (127 x 6.4 x 12.7 mm.) were obtained by milling these latter specimens.

Thereupon, the test was carried out in accordance with the method described in the ASTM D 671.

(c) Plates for obtaining specimens for the determination of the "Vicat" penetration temperature.—The procedure as described under point (b). The plate had a thickness of 6.4 mm. and specimens for the test were obtained from this latter (35 x 35 x 6.4 mm.). The test was then carried out according to the method described in the modified ASTM D 1525–58, that is, adopting a load of 5 kg. so as to conform to the VDE 0302 III standard.

(d) Plates for obtaining specimens for the determination of the Rockwell hardness.—The same method as under point (b) was used. The plate thus obtained had a thickness of 6.4 mm. and from this latter specimens (50 x 50 x 6.4) were obtained for the determination carried out according to the ASTM D 785 standards.

(e) Determination of the specific weight.—The measurements were carried out according to ASTM D 792 standards.

The characteristics relating to the composition listed on Table 1 are summarized in Table No. 2.

TABLE 2

| Characteristics | | Control | A | B | C |
|---|---|---|---|---|---|
| 1 | Processability in a roll-mill | (1) | Poor | Poor | Poor |
| 2 | Shrinkage of raw sheet (crepe) | (2) | (3) | (4) | (4) |
| 3 | Izod resilience at kg. cm./cm., 23° C | 3.8 | 4.3 | 4.6 | 4.3 |
| | Izod resilience at kg. cm./cm., 0° C | 3.5 | 3.5 | 3.5 | 3.3 |
| 4 | Vicat penetration temperature, ° C | 117 | 117 | 118 | 117 |
| 5 | Rockwell hardness | 103 | 102 | 101 | 102 |
| 6 | Elasticity modulus under flexure, kg./cm.² | 31,000 | 33,500 | 37,500 | 37,000 |
| 7 | Resistance to flexure (max. load), kg./cm.² | 980 | 1,000 | 1,050 | 1,020 |
| 8 | Specific weight, gr./cm.³ | 1.511 | 1.538 | 1.586 | 1.60 |

1 Very poor.
2 Considerable.
3 Light.
4 Absent.

From the examination of the above listed data it will be noticed that the introduction of increasing quantities of filler will determine, for the range considered, an improvement of the process-ability of the polymeric composition.

There is also an improvement in the appearance of the sheet material obtained for the processing of the polymeric composition, as well as an improvement in the elasticity modulus of the resistance to flexure.

The other characteristics, except the specific weight which latter obviously increases with the increasing in content of mineral filler, remain practically unchanged.

Example 2

The method described in the previous Example 1 was repeated and 3 polymeric compositions were prepared in which, for equal quantities of post-chlorinated polyvinyl chloride, thermal stabilizer, co-stabilizer and lubricant, different quantities of graft-copolymer between polyvinyl chloride and chlorinated polyolefin were used.

The quantities of the components of the mixtures and the characteristics thereof, are recorded in the following Table 3.

TABLE 3

| | Control | Sample | | |
|---|---|---|---|---|
| | | D | E | F |
| PVC/Cl | 100 | 100 | 100 | 100 |
| PVC/PE graft copolymer¹ | | 5 | 15 | 20 |
| Thermal stabilizer² | 1.5 | 1.5 | 1.5 | 1.5 |
| Co-stabilizer² | 0.5 | 0.5 | 0.5 | 0.5 |
| Lubricant² | 1.0 | 1.0 | 1.0 | 1.0 |

¹ Graft-copolymer between chloride and chlorinated polyethylene known on the market as "Opalon 740" of Monsanto Chemical Co. U.S.A., this product containing 10% of chlorinated polyethylene and 90% of chemically combined vinyl chloride.
² The same as in Example 1, Table 1, under point 3, 4 and 5.

The characteristics relating to the composition listed in Table 3 are recorded in Table 4.

TABLE 4

| Characteristics | | Control | D | E | F |
|---|---|---|---|---|---|
| 1 | Processability in a roll-mill | (1) | Good | Excellent | Excellent |
| 2 | Shrinkage of rawsheet (creep) | Considerable | (2) | (3) | (4) |
| 3 | Izod resilience at 23° C. kg. cm./cm. | 3.8 | 6.5 | 7 | 8.1 |
| | Izod resilience at 0° C. kg. cm./cm. | 3.5 | 5.4 | 5.4 | 6.5 |
| 4 | Vicat penetration temperature, °C | 117 | 113 | 106 | 94 |
| 5 | Rockwell hardness | 103 | 101 | 98 | 90 |
| 6 | Elasticity modulus under flexure, kg./cm.² | 31,000 | 30,500 | 30,000 | 27,500 |
| 7 | Resistance to flexure, (max. load), kg./cm.² | 980 | 980 | 920 | 840 |
| 8 | Specific weight, gr./cm.³ | 1.511 | 1.485 | 1.458 | 1.424 |

1 Very poor. 2 Light. 3 Almost absent. 4 Absent.

From the examination of the above listed data it will be seen that the introduction of increasing quantities of PVC/chlorinated polyethylene graft-copolymer considerably improves the workability of the mixture as well as the appearance of the sheet obtained by working the polymeric composition and the resilience of the material, both at room temperature and at low temperatures.

On the contrary, the Vicat penetration temperature, the resistance to flexure under load and the specific weight seem to be slightly reduced, still remain at acceptable values.

Example 3

The same procedure as that described in Example 1 was repeated and three polymeric compositions were prepared based on 100 parts of chlorinated polyvinyl chloride of the type described in Example 1, to which the same additives, such as stabilizers and lubricants of the type described in Example 1 were added; these mixtures contained furthermore, increasing quantities of PVC/chlorinated polyethylene graft-polymer of the type described in Example 2 and of a mineral charge of the type described in Example 1.

The composition of the mixtures above described and the properties thereof are listed respectively in the following Tables 5 and 6.

TABLE 5

| | Control, parts by weight | Sample, parts by weight | | |
|---|---|---|---|---|
| | | G | H | I |
| PVC/Cl | 100 | 100 | 100 | 100 |
| PVC/PE graft-copolymer | | 20 | 20 | 40 |
| Filler | | 5 | 20 | 20 |
| Thermal stabilizer | 1.5 | 1.5 | 1.5 | 1.5 |
| Co-stabilizer | 0.5 | 0.5 | 0.5 | 0.5 |
| Lubricant | 1.0 | 1.0 | 1.0 | 1.0 |

TABLE 6

| Characteristics | Control | G | H | I |
|---|---|---|---|---|
| Processability in a roll-mill | (1) | Good | Good | (2) |
| Shrinkage of raw sheet (crepe) | (3) | (4) | (5) | Absent |
| Izod resilience at 0° C., kg. cm./cm | 3.7 | 6 | 6.5 | 7.6 |
| Izod resilience at 23° C., kg. cm./cm | 3.5 | 4.9 | 4.9 | 5.4 |
| Vicat penetration temperature,° C | 117 | 112 | 113 | 107 |
| Rockwell hardness | 103 | 100 | 101 | 97 |
| Elasticity modulus under flexure, kg./m.² | 31,000 | 32,000 | 37,000 | 35,000 |
| Specific weight, gr./cc | 1.511 | 1.510 | 1.558 | 1.535 |

1 Very poor.  2 Excellent.  3 Considerable.  4 Very light.
5 Absent.

From the examination of the above listed data it will be clearly seen how the characteristics of polymeric compositions based on post-chlorinated polymers and/or copolymers of vinyl chloride may be improved by the simultaneous addition, according to the invention, of polyvinyl chloride chlorinated polyethylene graft-copolymer and with the addition of a mineral filler.

More particularly, by operating according to the present invention it becomes possible to achieve the following simultaneous results:

A considerable improvement in processability characteristics of the polymeric compositions according to the invention in comparison to that of the composition exclusively constituted by PVC/Cl.

A good improvement in the resilience characteristics of the polymeric compositions according to the invention, in comparison to that of the compositions exclusively constituted by PVC/Cl.

A good improvement of the elasticity modulus under flexure of the polymeric compositions according to the invention, with respect to that of the polymeric compositions exclusively constituted by PVC/Cl, while the other characteristics remain practically unchanged at values typical for the PVC/Cl or at least by values far higher than normal (not post-chlorinated) polyvinyl chloride.

As many apparently widely different embodiments of the present invention may be made without departing from the point and scope thereof, it is to be understood that the same is not to be limited to the specific embodiments thereof, except as defined by the appended claims.

What is claimed is:

1. A thermoplastic polymeric composition of matter having good processability, comprising (a) at least one post-chlorinated polymer of vinyl chloride, and (b) at least one graft copolymer of vinyl chloride on a chlorinated polyolefinic backbone, said component (b) being present in an amount ranging from between 0.5 and 100 parts per 100 parts by weight of component (a).

2. The composition of matter as defined by claim 1, wherein component (b) is present in an amount ranging from between 5 and 50 parts per 100 parts by weight of component (a).

3. The composition of matter as defined by claim 1, wherein the chlorinated polyolefin of component (b) is present in an amount ranging from between 8 and 12 percent by weight of said graft copolymer.

4. The composition of matter as defined by claim 1, further comprising (c) at least one mineral filler in an amount ranging from between 5 and 50 parts per 100 parts by weight of component (a).

5. The composition of matter as defined by claim 4, wherein the mineral filler is selected from the group consisting of calcium carbonate, quartz, silica and alumina.

6. The composition of matter as defined by claim 5, wherein the mineral filler is particulate.

7. The composition of matter as defined by claim 6, wherein the particles of mineral filler are coated with a member selected from the group consisting of a mineral wax, a fatty acid and a soap, at least 60 percent of which particles have a diameter of less than three microns and at least 80 percent having a diameter of less than 10 microns.

8. A composition of matter as defined by claim 4, further comprising at least one member selected from the group consisting of a thermal stabilizer, a light stabilizer, an atmospheric agent stabilizer, a UV-absorber, an antioxidant, an anti-blocking agent and a dye.

9. A shaped article comprised of the composition of matter as defined by claim 4.

10. A shaped article comprised of the composition of matter as defined by claim 8.

References Cited

UNITED STATES PATENTS

| 3,165,560 | 1/1965 | Frey et al. | 260—41 X |
| 3,167,598 | 1/1965 | Heaps et al. | 260—876 |
| 3,268,623 | 8/1966 | Beer | 260—878 |

MORRIS LIEBMAN, Primary Examiner

H. H. FLETCHER, Assistant Examiner

U.S. Cl. X.R.

260—96 HA, 876 R, 878 R